United States Patent [19]

Arbir et al.

[11] 4,456,696

[45] * Jun. 26, 1984

[54] CATALYST FOR MAKING POLYURETHANES

[75] Inventors: Francis W. Arbir, Itasca; Daniel S. Raden, Hawthorn Woods; Kenneth W. Narducy, Bloomingdale; Francois M. Casati, Highland Park, all of Ill.

[73] Assignee: Abbott Laboratories, North Chicago, Ill.

[*] Notice: The portion of the term of this patent subsequent to Dec. 20, 2000 has been disclaimed.

[21] Appl. No.: 435,843

[22] Filed: Oct. 21, 1982

Related U.S. Application Data

[63] Continuation-in-part of Ser. No. 252,634, Apr. 9, 1981, Pat. No. 4,421,673.

[51] Int. Cl.³ .............................................. B01J 31/04
[52] U.S. Cl. .................................... 502/167; 521/115; 521/116; 521/127; 521/129
[58] Field of Search ...................... 521/126, 127, 157; 528/49; 252/426; 502/167

[56] References Cited

U.S. PATENT DOCUMENTS

| | | | |
|---|---|---|---|
| 3,160,601 | 12/1964 | Hyde | 252/426 X |
| 3,591,524 | 7/1971 | Eriksen | 252/426 X |
| 3,706,687 | 12/1972 | Rudski | 252/426 X |
| 3,954,684 | 5/1976 | Farrissey et al. | 252/426 X |
| 4,040,992 | 8/1977 | Bechara et al. | 521/117 |
| 4,212,952 | 7/1980 | Murphy et al. | 521/112 |
| 4,421,673 | 12/1983 | Arbir et al. | 502/167 |

*Primary Examiner*—Patrick Garvin
*Attorney, Agent, or Firm*—Steven F. Weinstock; Martin L. Katz

[57] ABSTRACT

Polyurethane foams with excellent physical properties are obtained by using a catalyst composition of a tertiary amine and 2-ethylhexanoic acid.

4 Claims, No Drawings

CATALYST FOR MAKING POLYURETHANES

BACKGROUND OF THE INVENTION

This application is a continuation-in-part of U.S. Pat. No. 4,421,673 issued Dec. 21, 1982.

Polyurethane foams are widely used where rigid, semi-rigid or flexible foams are needed. In the production of foams of this type, a polyisocyanate is reacted with a blowing agent and a compound having at least two isocyanate-reactive hydrogen atoms, such as a polyol, to obtain the desired polymer. The formation of a polyurethane foam involves both: (a) a blowing reaction between the polyisocyanate and water, which produces carbon dioxide gas; and (b) a gelation or polymerization reaction between the poly-isocyanate and the polyol. A careful balance must be maintained between the blowing reaction and the gelation reaction in order to ensure the production of urethane foams having useful characteristics. For example, if the blowing reaction proceeds too quickly, too much carbon dioxide gas may be produced, resulting in poor foam strength, foam collapse, etc., particularly when the foam does not have sufficient gel strength to contain the gas. If the gelation reaction proceeds too quickly, the resulting foam may have undesirably low air flow characteristics and may be subject to shrinkage, etc.

A desired balance between the blowing reaction and the gelation reaction may be obtained by controlling the nature and amount of blowing agent(s) and catalysts for the blowing and gelation reactions, such as an amine catalyst and an organo-tin catalyst, respectively. Thus, increasing the amount of amine catalyst (or reducing the amount of organo-tin catalyst) will generally result in a more "open" foam exhibiting relatively higher air flow characteristics. On the other hand, decreasing the amount of amine catalyst (or increasing the amount of organo-tin catalyst) will generally result in a more "closed" foam exhibiting relatively lower air flow characteristics.

Normally, water is used to produce the blowing reaction. In many circumstances, however, it is desirable to employ an auxiliary blowing agent to facilitate the blowing reaction. Suitable auxiliary blowing agents known in the art include readily volatile organic substances. Specific examples of such auxiliary blowing agents include fluorocarbons and halogen-substituted alkanes, such as methylene chloride, chloroform, ethylidene chloride, vinylidene chloride, monofluorotrichloromethane, chlorodifluoromethane, dichloro difluoromethane and the like, and unhalogenated organic compounds such as acetone, ethylacetate, methanol, ethanol, butane, hexane, heptane, diethyl ether and the like. An auxiliary blowing effect may also be obtained by adding compounds which decompose during the polymerization reaction to yield gases (for example, nitrogen gas), such as azoisobutyronitrile. For various reasons, fluorocarbons, such as those sold by Dupont under the tradename Freon, have been commonly used as auxiliary blowing agents. However, due to environmental considerations, fluorinated hydrocarbons are in current disfavor and may some day have to be replaced entirely in formulations used on a large scale, such as in the manufacture of urethane foams.

The replacement of fluorocarbons with methylene chloride as an auxiliary blowing agent would be highly desirable due to the vapor pressure and other physical characteristics of methylene chloride, and to economic, environmental and other considerations. It has been found, however, that many prior art amine catalysts simply do not produce a useful urethane foam when methylene chloride is present, or require substantially increased amounts of organo-tin catalysts in order to produce the desired results.

DETAILED DESCRIPTION OF THE INVENTION

It has now been discovered that the foregoing and other problems with prior art urethane foam catalyst systems can be overcome by a catalyst composition of a partial salt between a tertiary amine catalyst and 2-ethylhexanoic acid (2-EHA). The new catalyst compositions and methods of the invention are highly useful in the production of urethane foams, and have been found to substantially reduce the amounts of organo-tin gelation catalysts normally required in the production of such foams, particularly in the presence of auxiliary blowing agents, such as methylene chloride.

As used herein, the term "partial salt" must be interpreted as meaning a combination of 10 equivalents of a tertiary amine with 1 to 5 equivalents of 2-ethylhexanoic acid, and by no means is intended to identify the named composition as a true salt.

Tertiary amines useful in the practice of the invention include tertiary amine catalysts known in the urethane foam art, such as, for example, triethylamine, triethylenediamine, N,N-dimethylethanolamine, N,N-dimethylbutylamine, N,N-dimethyl-(3-ethoxypropyl)amine, N,N-dimethylcyclohexylamine, N,N-dimethylbenzylamine, N-methyldicyclohexylamine, N,N,N',N'-tetramethylpropanediamine, N,N,N',N'-tetramethyl-1,3-butanediamine, N,N-bis(N',N'-dimethylaminopropyl)-N-(2-hydroxypropyl)amine, N,N,N-tris(N',N'-dimethyl-3-aminopropyl)amine, 3,3'-bis(dimethylamino)-N-methyldipropylamine, 3-dimethylaminopropylamine, and others, as well as mixtures of such tertiary amines. A presently particularly preferred tertiary amine for this purpose is 3-dimethylaminopropylamine (hereinafter referred to as DMAPA), although other tertiary amines may be used herein.

As mentioned before, the "salt" terminology applies only to part of the new catalysts since only 10 to 50 percent of the amine functions of the amine catalyst are blocked by 2-ethylhexanoic acid. The two reactants are therefore just simply mixed in the desired proportion for use as a urethane catalyst, requiring no other manipulations than the physical combining of the appropriate portions thereof. This mixture can then be used in the formulation leading to polyurethane foams and is particularly effective when methylene chloride is used as an auxiliary blowing agent. However, this invention is not limited to the use of the above partial salt between a tertiary amine and a 2-ethylhexanoic acid in methylene chloride blown foams; it can also be used in some fluorocarbon blown foams, particularly in connection with tin or other amine co-catalysts. The new catalysts are of greatest use where methylene chloride is used in conjunction with water and/or other auxiliary blowing agents, and, particularly in the presence of the commonly used diluent dipropylene glycol (DPG).

The catalysts compositions of the invention are also highly useful in urethane formulations containing an organo-tin gelation catalysts. Preferred organo-tin compounds for this purpose include the stannous salts of carboxylic acids, such as stannous acetate, stannous octoate, stannous ethylhexoate, stannous laurate, and the like, as well as the dialkyl tin salts of carboxylic acids, such as dibutyl tin diacetate, dibutyl tin dilaurate, dibutyl tin dimaleate, dioctyl tin diacetate, and the like. A presently highly preferred organo-tin catalyst for this purpose is stannous octoate. It has been found that the catalyst compositions of the invention substantially reduce the required levels of such organo-tin catalysts, particularly in urethane formulations additionally containing an auxiliary blowing agent such as methylene chloride.

To show the effect of the new catalysts, reference is made to the following examples, which, however, are for illustration only and are not intended to limit this invention in any respect. All parts and percentages used are based on weight unless specified differently; all catalyst and other component percentages are based on the amount of polyol used.

EXAMPLE 1

After mixing 100 parts of a polyoxyethylene-polyoxypropylene triol (marketed as Voranol 3010 by Dow Chemical), 3.5 parts of water, 12.0 parts of methylene chloride, 1.2 parts of a silicone surfactant (sold as Tegostab BF-2370 by Th. Goldschmidt AG), the shown amount of a 50% solution of stannous octoate in dioctyl phthalate (DOP) and the specified amount of the partially blocked DMAPA salt, the appropriate amount (110% of theoretically calculated stoichiometry, or 110 index) of a toluene di-isocyanate (sold as Mondur TD-80 by Mobay Chemical) is added and stirred at 3,000 rpm for 8 seconds with a 3-inch Conn mixer. The stirrer mixture is poured into a corrugated cardboard box, 17×17×15 inches, and allowed to rise, producing the results indicated below in Table I, using 2-ethylhexanoic acid for blocking.

using DMAPA blocked by 25 and 50%, respectively, of 2-ethylhexanoic acid starting with 0.1% catalyst and 0.35% stannous octoate.

EXAMPLE 2

In order to show the use of the above new catalyst in conjunction with other amine catalysts, DMAPA is used with 25% 2-EHA blockage. The formulation shown in Example 1 is used; the co-catalyst is $[Me_2N(CH_2)_3]_2N\text{-Me}$. As shown in Table II, good foams are obtained, particularly at lower tin catalyst levels.

TABLE II

| | | | | | | | | |
|---|---|---|---|---|---|---|---|---|
| Catalyst level | % | 0.15 | 0.15 | 0.15 | 0.125 | 0.125 | 0.125 | 0.125 |
| DPG | % | 0.15 | 0.15 | 0.15 | 0.125 | 0.125 | 0.125 | 0.125 |
| Co-Catalyst level | % | — | — | — | 0.05 | 0.05 | 0.05 | 0.05 |
| Stannous octoate (50% solution in DOP) | % | 0.6 | 0.7 | 0.8 | 0.6 | 0.7 | 0.8 | 1.0 |
| Cream time | Sec | 17 | 17 | 15 | 15 | 14 | 13 | 12 |
| Rise time | Sec | 150 | 140 | 125 | 140 | 130 | 116 | 102 |
| Gel time | Sec | 175 | 160 | 145 | 165 | 150 | 136 | 117 |
| Density | pcf | 1.29 | 1.24 | 1.23 | 1.24 | 1.21 | 1.29 | 1.18 |
| Airflow | scfm | 4.5 | 4.0 | 1.1 | 6.8 | 5.6 | 2.3 | 0.27 |
| 50% Compr. set | % | 6.8 | 7.7 | (D) | 6.7 | 6.4 | 7.9 | (D) |

(D) flattened out; collapsed

EXAMPLE 3

In order to show the activity of the above catalyst in a lower density foam, the formulation of Example 1 was changed by increasing the methylene chloride level to 18% and that of the surfactant to 1.8%. The same catalyst and co-catalyst was used as in Example 2 at levels indicated below. The DMAPA/2-EHA mixture again was used as a 50-% solution in DPG, the combined amount being given.

TABLE III

| | | | |
|---|---|---|---|
| Catalyst level | % | 0.33 | 0.42 |
| Co-Catalyst level | % | 0.07 | 0.08 |
| Stannous octoate (50% solution in DOP) | % | 0.8 | 0.8 |
| Cream time | Sec | 13 | 11 |
| Rise time | Sec | 132 | 125 |
| Gel time | Sec | 152 | 145 |
| Density | pcf | 1.08 | 1.08 |
| Air flow | Scfm | 7.2 | 7.1 |

The above results show that even low density foams can be made successfully, using the new catalyst. This was heretofore not possible with conventional catalysts at such low stannous octoate levels when methylene

TABLE I

| Amine type | | Mixture (A) | | | | | DMAPA + 25% EHA | | | DMAPA + 50% EHA | | |
|---|---|---|---|---|---|---|---|---|---|---|---|---|
| Amine level | % | 0.2 | 0.3 | 0.2 | 0.2 | 0.2 | 0.15 | 0.15 | 0.1 | 0.1 | 0.15 | 0.2 |
| DPG | % | 0 | 0 | 0 | 0 | 0 | — | 0.15 | 0.1 | 0.1 | 0.15 | 0.2 |
| Stannous octoate (50% solution in DOP) | % | 0.6 | 0.7 | 0.8 | 1.0 | 1.2 | 0.7 | 0.7 | 0.7 | 0.7 | 0.7 | 0.7 |
| Cream time | Sec | 18 | 13 | 17 | 15 | 15 | 15 | 16 | 17 | 16 | 13 | 12 |
| Rise time | Sec | (B) | (C) | (B) | 115 | 106 | 135 | 142 | 137 | 135 | 130 | 130 |
| Gel time | Sec | — | — | — | 155 | 141 | 160 | 167 | 162 | 155 | 150 | 150 |
| Density | pcf | — | — | — | 1.16 | 1.16 | 1.28 | 1.33 | 1.24 | 1.21 | 1.23 | 1.24 |
| Air flow | scfm | — | — | — | 7.43 | 3.83 | 5.0 | 5.6 | 5.5 | 4.7 | 5.5 | 5.5 |
| Compr. set 50% | % | — | — | — | — | — | 6.58 | 6.93 | 3.87 | 5.08 | 5.04 | 4.88 |
| Compr. set 90% | % | — | — | — | — | — | 22.07 | 7.93 | 4.84 | 5.63 | 5.33 | 5.32 |

(A) 33% triethylenediamine in DPG + equal parts of N—methyldicyclohexylamine (this mixture thus contains 33.3% DPG)
(B) Collapsed
(C) Split The above table demonstrates that using 0.2% or more of a standard catalyst does not produce a foam; unless at least 0.5% of stannous octoate is used; on the other hand, perfectly good foams are obtained when chloride was the auxiliary blowing agent.

EXAMPLE 4

The method and materials of Example 1 were used to determine the effect of varying amounts of blocking of DMAPA with octanoic acids. In all runs, 0.3% of a 50% solution of DMAPA or DMAPA/acid combination in DPG was used, together with 0.7% of a 50% stannous octoate solution in DOP. The results are shown in Table IV which includes an experiment using DMAPA partially blocked by valproic acid (V.A.).

TABLE IV

| Acid | | — | 2-EHA | 2-EHA | 2-EHA | V.A. |
|---|---|---|---|---|---|---|
| Blockage | % | 0 | 50 | 10 | 5 | 25 |
| Cream time | Sec | 10 | 16 | 16 | 14 | 17 |
| Rise time | Sec | 105 | 145 | 140 | 132 | 137 |
| Gel time | Sec | 145 | 188 | 184 | 172 | 177 |
| Health bubbles | | no | yes | yes | no | yes |
| Evaluation | | split | good | good | split | good |
| Density | Pcf | — | 1.22 | 1.20 | — | 1.27 |
| Air flow | Scfm | — | 4.1 | 7.9 | — | 4.1 |
| Comp. set 50% | % | — | 5.7 | 4.6 | — | 5.6 |
| Comp. set 90% | % | — | 6.9 | 5.0 | — | 13.0 |

Table IV shows that branched octanoic acids other than 2-ethylhexanoic acid can be used with equally good foams resulting therefrom. Also demonstrated is the fact that more than 5% of a branched octanoic acid is needed to produce an acceptable foam as 5% or less yields an unacceptable, split foam. Best results are seen using 20-30% equivalent of the above acid.

EXAMPLE 5

A mixture is formed of 100 parts of polyoxyethylene-polyoxypropylene triol (marketed as Voranol 3010 by Dow Chemical), 3.5 parts of water, 12.0 parts of methylene chloride, and 1.2 parts of a silicone surfactant (marketed as Tegostab BF-2370 by Th. Goldschmidt AG). To this mixture is added 0.7 parts of a 50% solution of stannous octoate in dioctyl phthalate (DOP), 46.8 parts (i.e., 110% of theoretical stoichiometric amount based upon polyol) of toluene di-isocyanate (marketed as Mondur TD-80 by Mobay Chemical), and 0.2 parts of one of the following amines, which have had 25% of their amine blocked by 2-ethylhexanoic acid:

| Reference | Amine |
|---|---|
| A | dimethylaminopropylamine |
| B | 3,3'-bis(dimethylamino)-N—methyldipropylamine |
| C | N,N,N—tris(N',N'—dimethyl-3-aminopropyl)amine |
| D | N,N—dimethylcyclohexylamine |
| E | 1,1,4,7,7-pentamethyldiethylenetriamine |

The resulting mixture is stirred at 3,000 rpm for 8 seconds with a 3-inch Conn mixer. The mixture is then poured into a corrugated box measuring 17×17×15 inches and allowed to rise. The results are shown in the following Table V:

TABLE V

| | Tertiary Amine | | | | |
|---|---|---|---|---|---|
| | A | B | C | D | E |
| Cream time (sec) | 17 | 17 | 17 | 19 | 13 |
| 1" Rise time (sec) | 28 | 25 | 25 | 27 | 23 |
| Rise time (sec) | 137 | 130 | 130 | 133 | 127 |
| Gel time (sec) | 162 | 170 | 157 | 173 | 167 |
| Health bubbles | yes | yes | yes | yes | yes |
| Air flow (Scfm) | 5.5 | 7.7 | 6.0 | 7.1 | 6.2 |

The data of Table V demonstrate that an illustrative variety of tertiary amines may be partially blocked with 2-ethylhexanoic acid to form catalysts capable of producing good foams.

EXAMPLE 6

Various mixtures are formed of 100 parts of a polyol (having an average molecular weight of 3,000, an average hydroxyl number of 56±2 and marketed as Multranol 7057 by Mobay Chemical), 3.5 parts of water, 18 parts of methylene chloride and 2.0 parts of a silicone surfactant (marketed as L 520 by Union Carbide Co.). To this mixture is added 47 parts of toluene di-isocyanate (marketed as Mondur TD-80 by Mobay Chemical), 0.8 parts of a 50% solution of stannous octoate in dioctyl phthalate (i.e., 0.4 parts of stannous octoate), 0.098 parts of DMAPA, 0.067 parts of pentamethyldipropylene triamine, 0.165 parts of dipropylene glycol (DPG), and the amounts of 2-ethyl hexanoic acid shown in Table VI. The mixture is stirred at 3,000 rpm for 8 seconds with a 3-inch Conn mixer. The stirred mixture is poured into a 17×17×15 inch corrugated cardboard box and allowed to rise producing the results shown in the following Table VI:

TABLE VI

| 2-ethyl hexanoic acid (parts) | None | 0.04 | 0.07 | 0.10 | 0.15 |
|---|---|---|---|---|---|
| Cream time (sec) | 8 | 8 | 8 | 8 | 8 |
| Rise time (sec) | 115 | 115 | 115 | 115 | 115 |
| Density (Pcf) | 1.16 | 1.13 | 1.16 | 1.20 | 1.16 |
| Air flow (scfm) | 9.8 | 8.9 | 8.0 | 5.9 | 3.2 |

The foregoing data clearly demonstrates that the addition of increasing amounts of 2-ethyl hexanoic acid results in substantially decreased air flow without materially affecting reactivity (i.e., cream time and rise time) or foam density.

EXAMPLE 7

A first mixture (A) is formed of 100 parts of the polyol of Example 6, 3.5 parts of water, 18 parts of methylene chloride, 47 parts of the toluene di-isocyanate of Example 6, 0.098 parts of DMAPA, 0.067 parts of pentamethyldipropylene triamine, and 0.936 parts of a 50% solution of stannous octoate in dioctyl phthalate (i.e., 0.468 parts of stannous octoate). A second mixture (B) is formed with a similar composition except that it contains 0.80 parts of a 50% solution of stannous octoate in dioctyl phthalate (i.e., 0.40 parts of stannous octoate), and additionally contains 0.068 parts of 2-ethylhexanoic (2-EHA) acid. The mixtures are mixed and allowed to rise following the procedure of Example 6. The results are shown in the following Table VII.

TABLE VII

| | A | B |
|---|---|---|
| Stannous octoate (parts of 50% solution) | 0.936 | 0.80 |
| 2-EHA (parts) | 0 | 0.068 |
| Cream time (sec) | 11 | 11 |
| Rise time (sec) | 118 | 130 |
| Density (pcf) | 1.10 | 1.10 |

TABLE VII-continued

|  | A | B |
|---|---|---|
| Air flow (scfm) | 7.8 | 7.5 |

As shown in Table VII, an increase in air flow that would normally be expected from reducing the stannous octoate level by about 15% from mixture A to mixture B does not occur. Rather, a net decrease in air flow is obtained due to the presence of 2-ethylhexanoic acid. It is therefore apparent that substantially equivalent foams produced from mixtures having reduced tin levels are obtained by carrying out the reaction in the presence of a catalytic tertiary amine which has been partially blocked by 2-ethylhexanoic acid.

Since process times increase expectedly by blocking parts of the active catalyst, the use of more than 50% blocked tertiary amine becomes uneconomical, although good foams may be obtained with 50-75% blocked tertiary amine.

Since catalyst mixtures usually are provided in liquid form, it is particularly noteworthy that the new salts are also conveniently soluble in DPG, a solvent frequently used for free amine catalysts for urethane reactions. DPG is a favored solvent because it is a reactive participant in the fashion of the polyol used. Excellent catalyst compounds are therefore those where tertiary amine is blocked by 10-50 equivalent % with a branched octanoic acid and the mixture is dissolved in 50-200% DPG. A very practical and suitable solution contains one part of tertiary amine partial salt to one part of DPG, said salt representing 10-50% of the total catalyst content.

In one embodiment of the process of the invention, a polyurethane foam is prepared by reacting a polyisocyanate with a polyol in the presence of a catalytically effective amount of a catalyst composition of a tertiary amine and 10-50 equivalent-% thereof of 2-ethylhexanoic acid. As used herein. "catalytically effective amount" is intended to mean any amount effective to catalyze the reaction between the polyisocyanate and the polyol. In one presently preferred process of the invention, the polyisocyanate and the polyol are reacted in the presence of from about 0.1 to about 1.0% by weight of the catalyst composition of the invention, based on the weight of polyol, although it is contemplated that in some circumstances in may be desirable to employ less than 0.1% by weight or more than 1.0% by weight of the catalyst composition of the invention. In a preferred process of the invention, a polyurethane foam is prepared by reacting a polyisocyanate and a polyol in the presence of water and at least one auxiliary blowing agent, such as methylene chloride, a fluorocarbon, or a mixture of auxiliary blowing agents; a tertiary amine partially blocked by 2-ethyl hexanoic acid; and, optionally, an amount of DPG equivalent to the weight of said partially blocked tertiary amine. In addition other catalysts such as organo-tin compounds, other primary, secondary or tertiary amines, or other conventional additives, such as surfactants, emulsifiers, foam stabilizers, cell regulators, dyes, flame retardants, plasticizers, biocides, fillers, and the like, may be added to the reaction mixture. These additional materials and auxiliary blowing agents would preferably be selected by the processor to best suit his individual needs. Thus, the preferred catalyst solution according to this invention may include from about 0.1 to about 0.8% by weight of an organo-tin compound, based on the weight of the polyol.

The compounds of the present invention are usable with all types of polyols and polyisocyanates. A representative list of these can be found in U.S. Pat. No. 4,212,952, col. 2, line 60 to col. 3, line 9 and col. 2, lines 30-59, respectively.

What is claimed is:

1. A catalyst composition for preparing urethane foams, comprising a physical mixture of a tertiary amine and 10-50 equivalent-% thereof of 2-ethylhexanoic acid.

2. The composition of claim 1 wherein said equivalent is between 20 and 30%.

3. The composition of claim 1 dissolved in dipropylene glycol.

4. The composition of claim 1 dissolved in 0.5 to 2.0 parts of dipropylene glycol per part of said catalyst composition.

* * * * *